United States Patent
Hansen et al.

(10) Patent No.: US 11,295,264 B2
(45) Date of Patent: Apr. 5, 2022

(54) METHOD AND SYSTEM FOR QUERY ANSWERING OVER PROBABILISTIC SUPPLY CHAIN INFORMATION

(71) Applicant: SIEMENS AKTIENGESELLSCHAFT, Munich (DE)

(72) Inventors: Ralf Hansen, Schwabach (DE); Thomas Hubauer, Munich (DE); Steffen Lamparter, Feldkirchen (DE); Raffaello Lepratti, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 815 days.

(21) Appl. No.: 14/478,123

(22) Filed: Sep. 5, 2014

(65) Prior Publication Data
US 2015/0066829 A1 Mar. 5, 2015

(30) Foreign Application Priority Data
Sep. 5, 2013 (EP) ..................................... 13183183

(51) Int. Cl.
*G06Q 10/08* (2012.01)
*G06N 7/00* (2006.01)
(52) U.S. Cl.
CPC ............. *G06Q 10/08* (2013.01); *G06N 7/005* (2013.01)
(58) Field of Classification Search
CPC ................................ G06Q 10/08; G06N 7/005
USPC .......................................................... 706/46
See application file for complete search history.

(56) References Cited

U.S. PATENT DOCUMENTS

| | | | | |
|---|---|---|---|---|
| 7,668,761 | B2* | 2/2010 | Jenkins | G06Q 10/087 705/28 |
| 9,172,738 | B1* | 10/2015 | daCosta | H04L 67/00 |
| 2011/0238603 | A1 | 9/2011 | Peoples et al. | |
| 2011/0307898 | A1* | 12/2011 | Fischer | G06F 9/50 718/104 |
| 2012/0117009 | A1 | 5/2012 | Dutt et al. | |
| 2012/0215450 | A1* | 8/2012 | Ashok | G05B 23/0254 702/9 |
| 2013/0246315 | A1* | 9/2013 | Joshi | G06N 5/04 706/10 |

FOREIGN PATENT DOCUMENTS

| | | |
|---|---|---|
| CN | 102640154 A | 8/2012 |
| CN | 102799674 A | 11/2012 |

OTHER PUBLICATIONS

Wasserkrug, et al. "Complex Event Processing Over Uncertain Data", Proceedings of second international conference on distriuted event-based systems, Jul. 1-4, 2008.*

(Continued)

*Primary Examiner* — Tsu-Chang Lee
(74) *Attorney, Agent, or Firm* — Laurence A. Greenberg; Werner H. Sterner; Ralph E. Locher

(57) ABSTRACT

A method predicts a derivable event in a logistic network. The method includes generating a Bayesian network describing a structure of at least a part of a logistic network. A query is received for the derivable event that depends on a combination of base events in the logistic network. The Bayesian network is instantiated for a plurality of points in time. A prediction of the derivable event is deduced from the instantiated Bayesian network by use of complex event processing.

16 Claims, 1 Drawing Sheet

(56) References Cited

OTHER PUBLICATIONS

Thambidurai, "RFID Probabilistic Complex Event Processing in a Real-Time Product Manufacturing System", Internal Journal of Engineering and Innovative Technology (IJEIT), vol. 2, Issue 10, Apr. 2013.*
Zhang et al. "Decision support analysis for safety control in complex project environments based on Bayesian Networks", Expert Systems with Applications 40 (2013) 4273-4282 (Year: 2013).*
F. Wang et al., "Complex RFID event processing", The VLDB Journal (2009) 18:913-931 (Year: 2009).*
Warhanek, Maximilian, et al., "Probabilistic supply chain monitoring for reactive production scheduling," spring semester 2012.
RFD-Based Automotive Network, "RAN—Die Projectfilme", www.autoran.de, retrieved May 9, 2013.
Wikipedia, "Radio-frequency identification", http://en.wikipedia.org/wiki/Rfid, retrieved May 9, 2013.
Wikipedia, Complex event processing, http://en.wikipedia.org/wiki/Complex_event_processing, retrieved May 9, 2013.
Heinecke, Georg, "Formalisierung von Produktions—und Logistikprozessen für eine Systemanalyse", MA SS 12, IWF, published Dec. 18, 2011.
Wang et al., "Plan based Parallel Complex Event Detection over RFID Streams", The 1st International Conference on Information Science and Engineering (ICISE 2009) pp. 315-319.
Kawashima et al., "Complex Event Processing over Uncertain Data Streams", 3PGCIC, IEEE Computer Society, 2010, pp. 521-526.
Wang et al., "Complex Event Processing over Distributed Probabilistic Event Streams", FSKD, IEEE Computer Society, 2012, pp. 1489-1493.
Khoussainova et al., "Probabilistic Event Extraction from RFID Data" Proceedings of the IEEE 24th International Conference on Data Engineering (ICDE 2008), 2008, pp. 1480-1482.
Re, C et al., "Event Queries on Correlated Probabilistic Streams" SIGMOD Conference, 2008, 15 pages.
Heinecke, Georg et al.:"Modeling the Basic Cause-Effect Relationship between Supply Chain Events and Performance"; in: 3rd International Conference on Dynamics in Logistic; URL:http://e-collection.library.ethz.ch/eserv/eth:6194/eth-6194-01.pdf (the whole document); XP055095078.
Zhe Wang, Daisy et al.:"Probabilistic Complex Event Triggering"; in: Technical Report No. UCB/EECS-2009-114, http://www.eecs.berkeley.edu/Pubs*TechRpts/2009/EECS-2009-114.html Aug. 11, 2009 (the whole document); XP 55095050.
Schilling, Björn et al.:"Access Policy Consolidation for Event Processing Systems"; in: Networked Systems (NETSYS), 2013, Conference on, IEEE; pp. 92-101; DOI: 10.1109/NETSYS.2013.18; ISBN: 978-1-4673-5645-9; XP032422281.
Zhe Wang, Daisy et al.:"Probabilistic Complex Event Triggering", Technical Report No. UCB/EECS-2009-114, http://www.eecs.berkeley.edu/Pubs/TechRpts/2009/EECS-2009-114.html, Aug. 11, 2009, XP 55095050.

* cited by examiner

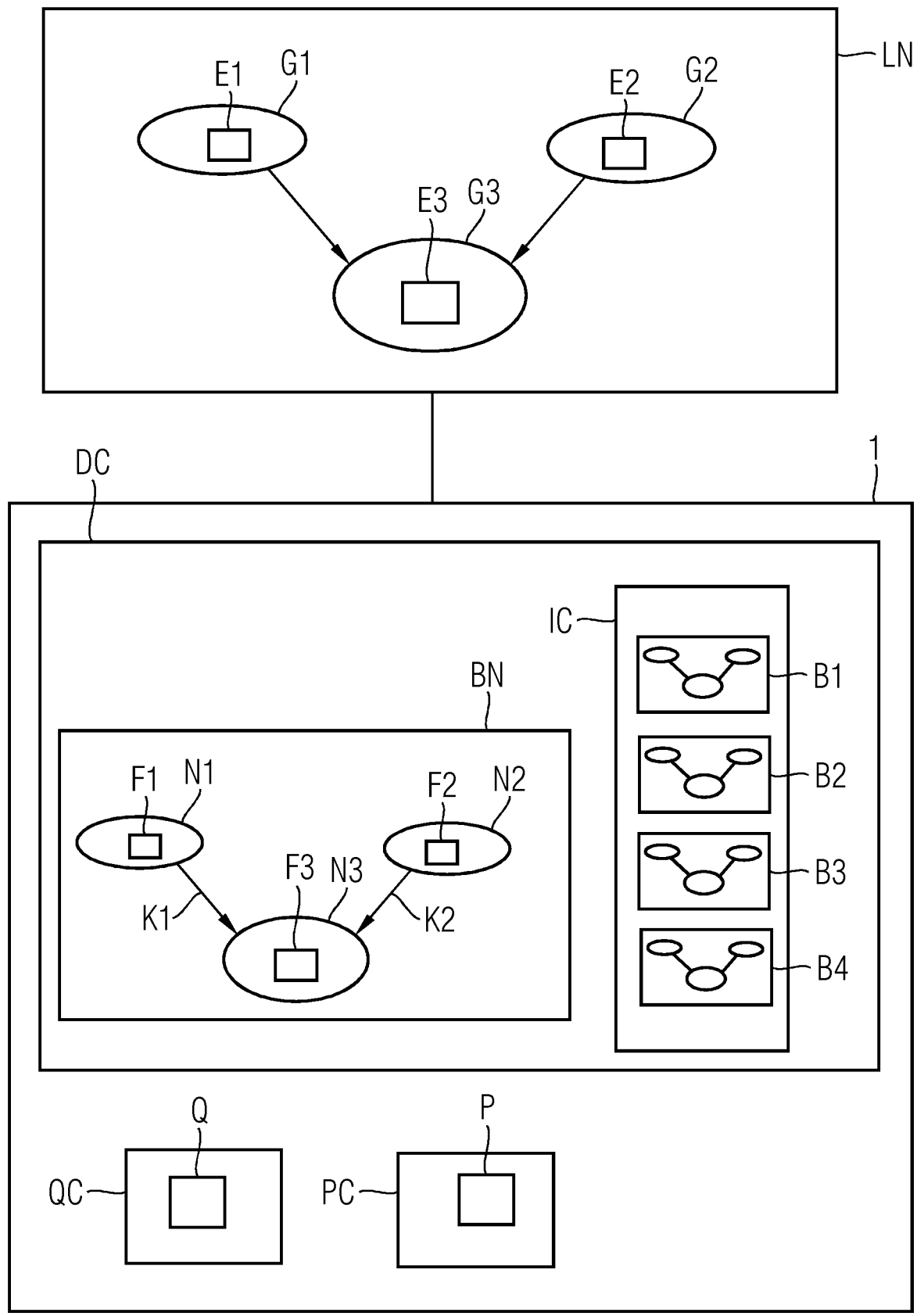

METHOD AND SYSTEM FOR QUERY ANSWERING OVER PROBABILISTIC SUPPLY CHAIN INFORMATION

CROSS-REFERENCE TO RELATED APPLICATION

This application claims the priority, under 35 U.S.C. § 119, of European application EP 13 183 183.6, filed Sep. 5, 2013; the prior application is herewith incorporated by reference in its entirety.

BACKGROUND OF THE INVENTION

Field of the Invention

The invention described in this document relates to the technical field of query answering over probabilistic supply chain information, and in particular to methods and systems for temporal query answering over probabilistic supply chain information.

Logistic processes such as supply chains are subject to a large number of potential disturbances such as traffic delays, production delays, or even total failure of certain suppliers. To introduce transparency into such processes, monitoring technologies are used to determine the location of parts, products, etc and thus assess arrival times, delays, etc. One example for such an approach is the project RAN (RFID-based Automotive Network) as described in www.autoran.de, where radio-frequency identification (RFID) tags and corresponding gates are employed to localize units in both intra-tier and inter-tier logistics and production processes. An overview over RFID can be found in http://en.wikipedia.org/wiki/Rfid. Both data received from e.g. RFID-gates and the underlying models of the logistic/production processes, however, are typically prone to uncertainty.

http://en.wikipedia.org/wiki/Complex_event_processing provides an overview over complex event processing.

Prediction of arrival times in complex meshed logistic networks has been a challenging research topic for several years, especially taking into account formal requirements such as the results forming a correct probability space.

Knowledge-based construction of Bayesian networks was recently proposed in a Master thesis by Warhanek (supervised by Heinecke, Lamparter et al.), see: Georg Heinecke, Students: Maximilian Warhanek, Master thesis, entitled "Formalisierung von Produktions- und Logistikprozessen für eine Systemanalyse", ETH, 2011.

Complex event processing (CEP) is an inference technology configured for extracting high-level temporal information from (event or signal) data streams by knowledge models typically represented by production rules. Two major features distinguishing CEP from other forms of logic-based inference systems are (a) the strong focus on handling continuous streams of data, and (b) the explicit handling of temporal information by special language constructs that allow users to formulate temporal dependencies between events/measurement (sequences, minimum/maximum time windows between events, etc). However, the majority of current CEP systems focus on deterministic reasoning: All input data is assumed to be deterministic, and the rule language does not allow formulating rules that allow users to express probabilistic dependencies or thresholds on probabilities. The few notable exceptions known to the authors are listed in the following, it is however important to note that while these probabilistic complex event processing systems address (some part of) the querying problem, they do not provide any means for arrival time prediction.

Approaches based on the SASE model use nondeterministic finite automata for evaluating answer probabilities for CEP queries. However, this approach inherently requires the events in the input streams to be independent (stochastically) and can therefore only provide a simplified picture of reality. Such approaches are discussed in an article by: Wang, Y.; Cai, J. & Yang, S. Plan based Parallel Complex Event Detection over RFID Streams, Proceedings of the 1st International Conference on Information Science and Engineering (ICISE 2009), 2009, 315-129; and in an article by Kawashima, H.; Kitagawa, H. & Li, X., entitled "Complex Event Processing over Uncertain Data Streams", 3PGCIC, IEEE Computer Society, 2010, 521-526; and in an article by Wang, Y. & Zhang, X., entitled "Complex Event Processing over Distributed Probabilistic Event Streams", FSKD, IEEE Computer Society, 2012, 1489-1493.

Approaches that are rooted in probabilistic databases use so called ctables for representing provenance information required for probability calculation of answers. However, similar to the automata-based approaches a basic assumption is the independence of the input streams and thus of input events. Such approaches are discussed in an article by: Khoussainova, N.; Balazinska, M. & Suciu, D., entitled "Probabilistic Event Extraction from RFID Data", proceedings of the IEEE 24th International Conference on Data Engineering (ICDE 2008), 2008, 1480-148; and in Ré, C.; Letchner, J.; Balazinska, M. & Suciu, D. entitled "Event Queries on Correlated Probabilistic Streams", SIGMOD Conference, 2008, 715-72.

Summing up, no working solution combining arrival time prediction and complex event querying over probabilistic data (and rules) has been proposed yet.

SUMMARY OF THE INVENTION

It is an object of the present invention to improve prediction of derivable events such as the arrival time of an object or the arrival time. Another object is to allow for prediction of complex logically concatenated events.

According to an aspect a method for predicting a derivable event in a logistic network is proposed. According to the method, a Bayesian network is generated. The Bayesian network describes the structure of at least a part of the logistic network. A query for a derivable event is received. The derivable event depends on a combination of base events in the logistic network. The Bayesian network is instantiated for a plurality of points in time. A prediction of the derivable event is deduced from the instantiated Bayesian network by complex event processing.

According to another aspect a system containing means that are adapted for performing the steps of the method is proposed.

According to another aspect a device containing and/or being associated with a processor unit and/or a hard-wired circuit and/or a logic device that is arranged such that the method is executable thereon is proposed.

According to another aspect a computer program product, directly loadable into a memory of a digital computer, containing software code portions for performing the steps of the method is proposed.

According to another aspect a computer readable medium, having computer-executable instructions adapted to cause a computer system to perform the steps of the method is proposed.

According to another aspect a system for predicting a derivable event in a logistic network is proposed. The system contains a describer component, a query component, a instantiation component, and a prediction component. The describer component is adapted for describing the structure of at least part of a logistic network by a Bayesian network. The query component is adapted for receiving a query for a derivable event that depends on a combination of base events in the logistic network. The instantiation component is adapted for instantiating the Bayesian network for a plurality of points in time. The prediction component is adapted for deducing a prediction of the derivable event from the instantiated Bayesian network by complex event processing.

Other features which are considered as characteristic for the invention are set forth in the appended claims.

Although the invention is illustrated and described herein as embodied in a method and system for query answering over probabilistic supply chain information, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is an illustration of a system and a method according to preferred embodiments of the invention.

DETAILED DESCRIPTION OF THE INVENTION

Referring now to the single FIGURE of the drawing in detail, there is shown a system 1 for predicting a derivable event E3 in a logistic network LN according to a preferred embodiment of the invention.

The logistic network LN contains gates G1, G2, G3. The gates G1, G2, G3 can for example be RFID gates that register events E1, E2, E3, such as the arrival of certain objects to which an RFID tag is attached. The gates G1 and G2 can for example be located at a provider venue, while the gate G3 is located at a factory which requires the objects for producing other goods out of them. The event E3 is therefore a derivable event E3 which means that it depends on a combination of base events E1, E2 in the logistic network LN, in the example in the FIGURE this is the arrival of goods at the gates G1 and G2, which means that the goods will likely arrive at some later point in time at the factory G3. Of course, a logistic network of a factory is likely to be more complex than the one shown in the FIGURE and the derivable event E3 is likely to depend on a larger number of base events which in addition can depend in a more complex way from each other than is depicted in the FIGURE. For better understanding, the network in the FIGURE was chosen not to be unnecessarily complex.

The gates G1, G2, G3 are connected to the system 1 for transmitting registered events to the system 1.

The system 1 contains a describer component DC, a query component QC, an instantiation component IC, and a prediction component PC. The describer component DC is adapted for describing the structure of at least part of the logistic network LN by a Bayesian network BN. The query component QC is adapted for receiving a query Q for the derivable event E3. The instantiation component IC is adapted for instantiating the Bayesian network BN for a plurality of points in time. The prediction component PC is adapted for deducing a prediction P of the derivable event E3 from the instantiated Bayesian network BN by complex event processing.

The Bayesian network 1 contains nodes N1, N2, N3 and edges K1, K2. The nodes N1, N2, N3 describe the gates G1, G2, G3 respectively. Each node N1, N2, N3 of the Bayesian network BN contains a probabilistic function F1, F2, F3 representing a probabilistic distribution for one of the events E1, E2, E3. The edges K1, K2 represent conditional dependencies between the base events E1, E2. In the context of this application, an event can e.g. also include that a variable reaches a certain value, is within a certain range of values, or reaches one of a plurality of values.

The system 1 contains components DC, IC, QCC, PC that are adapted for performing the steps of the methods as described in the following.

According to preferred embodiments a device contains and/or is associated with a processor unit and/or a hard-wired circuit and/or a logic device that is arranged such that one of the methods described in the following is executable thereon.

According to preferred embodiments a computer program product, directly loadable into a memory of a digital computer, contains software code portions for performing the steps of one of the methods method described in the following.

According to preferred embodiments a computer readable medium, having computer-executable instructions is adapted to cause a computer system to perform the steps of one of the methods described in the following.

Referring to the FIGURE, in order to predict the derivable event E3 in the logistic network LN, a Bayesian network BN describing the structure of at least a part of the logistic network LN is generated. A query Q for a potentially complex derivable event is inputted into and received by the query component QC. Preferably the derivable event and/or the query is time based. Preferably the query depends on a logic or temporal combination of base events E1, E2 that can occur in the logistic network LN. The instantiation component IC instantiates the Bayesian network BN for a plurality of points in time. The plurality of points in time preferably represent a limited number of time slices. A temporal prediction P of the derivable event E3 is deduced from the instantiated Bayesian network BN by complex event processing.

According to preferred embodiments, instantiating the Bayesian network BN is performed by creating adapted copies B1, B2, B3, B4 of the Bayesian network BN for every point in time relevant for the received query Q. The adapted copies B1, B2, B3, B4 are adapted to events E1, E2, E3 that were registered in the logistic network LN. Preferably, by adapting the nodes of the adapted copies, or preferably by adapting a probabilistic function of the node such that the registered base event has a probability of 1 reflecting that the event was registered.

According to another preferred embodiment the complex event processing determines how information from the different adapted copies B1, B2, B3, B4 of the Bayesian network BN is combined in order to deduce the prediction of the derivable event E3.

According to another preferred embodiment instantiating the Bayesian network BN contains construction of one Bayesian Network BN per relevant point in time or time slice in the logistic network LN. Preferably the prediction component is adapted to construct one Bayesian network per point in time or time slice in the logistic network.

According to another preferred embodiment at least a part of the nodes N3 of the Bayesian network BN are dependent on other nodes N1, N2 of the Bayesian network BN, representing events E3 that are dependent on other base events E2, E3 in the logistic network LN. The prediction for the derivable event E3 is at least partially based on the dependent nodes N3 in the Bayesian network BN.

According to another preferred embodiment the query Q and/or the derivable event E3 contains a condition. The condition can for example be a temporal condition and/or an availability of an object, and/or a time based availability of the object. Preferably the condition is an arrival of the object at a certain time.

According to another preferred embodiment the query Q is expressed using a query language, preferably SPARQL. Preferably the query Q is evaluated over the instantiated Bayesian network BN.

According to another preferred embodiment the prediction for the derivable event E3 is repeated based on updated information in the Bayesian network BN when a base event E1, E2 occurs in the logistic network. Such a base event is for example a message from an RFID gate in the logistic network that a certain object has been registered at the RFID gate. When such information arrives at the system 1, certain nodes of the Bayesian network BN become observing nodes. For example if at a certain point in time t with a probability of 90% a certain object will arrive at an RFID gate, the node in the Bayesian network BN representing the gate is a calculated node. If at point in time t+1 the objection arrives and is registered at the RFID gate, then the node becomes an observed node instead of a calculated one. The probability is then 100% that the event occurred. From that point in time t+1, the probabilities of the other calculated nodes are newly calculated by means of any known algorithm for Bayes networks.

According to another preferred embodiment states of the nodes N1, N2, N3 of the instantiated Bayesian networks B1, B2, B3, B4 are set based on data representing base events that occurred in the logistic network LN. The data are preferably expressed in the RDF-format (RDF: Resource Description Framework). EPCIS-information representing measured events e.g. from the RFID gates as well as predications (such as "x arrives at point in time y with a probability z") are preferably expressed in RDF.

Preferred embodiments of the invention address uncertainty of given information in a logistic or production process. This challenge is complicated in addition by the fact that observed base events may be causally connected and thus probabilistically dependent. For example, all parts in the same truck have the same probability of being late.

Preferred embodiments of the invention address the challenge of answering complex queries over probabilistic arrival time predictions in logistic networks by combining Bayesian network-based arrival time prediction with SPARQL-based formulation and answering of complex event processing (CEP) queries. The approach thereby utilizes the strengths of declarative knowledge representation formalisms (e.g. intuitive and maintainable) and combines them with the strength of probabilistic reasoning (e.g. robustness in case of uncertainty and error-prone data) in a novel way.

Preferred embodiments of the invention use a method based on knowledge-based construction of Bayesian networks recently proposed and already cited in this document in the Master thesis by Warhanek (supervised by Heinecke, Lamparter et al.), and extend it by the required CEP functionality.

According to preferred embodiments of the invention a combination of Bayes Net based arrival time prediction and SPARQL-based query processing are proposed to solve the challenge of answering complex queries over probabilistic arrival time predictions in logistic networks. In detail, preferred embodiments work as follows:

Step 1. The arrival time prediction component uses the algorithm proposed by Warhanek et al. to construct one Bayesian network per time slice in the logistic network under consideration. The duration distributions encoded in the rules are used to parameterize the networks. Inference then leads to a distribution over the delays (and thus arrival times) for the different items in the supply chain. This calculation is repeated whenever new information (e.g. from RFID readers) arrives (where typically new information on an item reduces the uncertainty associated with its arrival time).

Step 2. The results are stored in RDF format, potentially in form of RFD streams.

Step 3. Queries are expressed using SPARQL and evaluated over the RDF data. As an example, consider the evaluation of "A after B" which expresses (in our context) that B arrives before A. Note that from step 1 and 2, we have distributions over the arrival times of A and B in a certain granularity, e.g. 10 minute steps. From that information, the probability of B arriving before A can be calculated by summing over all time points t the probability that B has arrived at time t whereas A has not arrived yet, i.e. P(arrived (B,t) AND NOT arrived(A,t)). More specifically all relevant time points, i.e. all time points between the earliest arrival time of B and the latest arrival time of A.

Note that P(arrived(B,t) AND NOT arrived(A,t))=P(arrived(B,t))*(1−P(arrived(A,t))), where the two probability values can be read from the data stored in step 2. As a side note, this formula assumes that arrival of A and B are independent from each other. However, this assumption is valid at that point of time since supply-chain induced dependencies have already been handled by the Bayesian Net-based arrival time prediction component.

Step 4. The result for the query is returned to the user.

An advantage of preferred embodiments of the invention lies in the innovative combination of probabilistic arrival time prediction and probabilistic complex event processing to yield a probabilistic query processing engine for supply-chain queries. The approach thereby supports sound and robust arrival time predictions while allowing operators to specify their reporting and fault handling rules in an intuitive manner. Moreover, by handling inter-event dependencies in the prediction component, the proposed solution addresses the problem of neglected event-interdependencies lined out in the context of existing probabilistic CEP engines.

The invention claimed is:

1. A method for predicting a derivable event in a logistic network, which comprises the steps of:
generating a Bayesian network describing a structure of at least a part of the logistic network;
receiving a query for the derivable event that depends on a combination of base events in the logistic network;
instantiating the Bayesian network for a plurality of points in time in response to the query in order to obtain a plurality of different copies of the Bayesian network; and deducing a prediction of the derivable event by using complex event processing to combine information from the plurality of different copies of the Bayesian network, wherein the derivable event is an arrival of an item in a supply chain, and wherein the item is selected from the group consisting of objects from which goods will be produced at a factory.

2. The method according to claim 1, wherein the Bayesian network contains nodes and edges, wherein each of the nodes of the Bayesian network have a probabilistic function representing a probabilistic distribution for one of the base events, and wherein the edges represent conditional dependencies between the base events.

3. The method according to claim 2, wherein at least a part of the nodes of the Bayesian network are dependent on other nodes of the Bayesian network, representing events that are dependent on other base events in the logistic network, and wherein a deduction of the prediction for the derivable event is at least partially based on dependent nodes in the Bayesian network.

4. The method according to claim 2, wherein states of the nodes of the instantiated Bayesian networks are set based on data representing the base events in the logistic network.

5. The method according to claim 4, wherein the data are expressed in a resource description framework (RDF) format.

6. The method according to claim 1, which further comprises performing the instantiating of the Bayesian network by creating adapted copies of the Bayesian network for every point in time relevant for a received query wherein the adapted copies are adapted to the base events that were registered in the logistic network, and/or wherein the complex event processing determines how information from different adapted copies of the Bayesian network is combined to deduce the prediction of the derivable event.

7. The method according to claim 1, which further comprises performing the instantiating of the Bayesian network by construction of one Bayesian network per point in time in the logistic network.

8. The method according to claim 1, wherein the query and/or the derivable event contains a condition, wherein the condition is a temporal condition and/or an availability of an object.

9. The method according to claim 8, wherein the condition is a time based availability of the object.

10. The method according to claim 1, wherein the query is expressed using a query language.

11. The method according to claim 1, wherein the prediction for the derivable event is repeated based on updated information in the Bayesian network when a base event occurs in the logistic network arrives.

12. The method according to claim 1, wherein the query is expressed using SPARQL and evaluated over the instantiated Bayesian network.

13. The method according to claim 1, the logistic network is a supply chain.

14. A device, comprising:
an apparatus selected from the group consisting of a processor and a hard-wired circuit, said apparatus configured to perform a method for predicting a derivable event in a logistic network, which comprises the steps of:
generating a Bayesian network describing a structure of at least a part of the logistic network;
receiving a query for the derivable event that depends on a combination of base events in the logistic network;
instantiating the Bayesian network for a plurality of points in time in response to the query in order to obtain a plurality of different copies of the Bayesian network; and
deducing a prediction of the derivable event by using complex event processing to combine information from the plurality of different copies of the Bayesian network, wherein the derivable event is an arrival of an item in a supply chain, and wherein the item is selected from the group consisting of objects from which goods will be produced at a factory.

15. A non-transitory computer program product, directly loadable into a memory of a digital computer, containing software code portions for performing a method for predicting a derivable event in a logistic network, which comprises the steps of:
generating a Bayesian network describing a structure of at least a part of the logistic network;
receiving a query for the derivable event that depends on a combination of base events in the logistic network;
instantiating the Bayesian network for a plurality of points in time in response to the query in order to obtain a plurality of different copies of the Bayesian network; and
deducing a prediction of the derivable event by using complex event processing to combine information from the plurality of different copies of the Bayesian network, wherein the derivable event is an arrival of an item in a supply chain, and wherein the item is selected from the group consisting of objects from which goods will be produced at a factory.

16. A non-transitory computer readable medium, having computer-executable instructions adapted to cause a computer system to perform a method for predicting a derivable event in a logistic network, which comprises the steps of:
generating a Bayesian network describing a structure of at least a part of the logistic network;
receiving a query for the derivable event that depends on a combination of base events in the logistic network;
instantiating the Bayesian network for a plurality of points in time in response to the query in order to obtain a plurality of different copies of the Bayesian network, wherein the Bayesian network includes a plurality of nodes, each one of the plurality of nodes has a probabilistic function representing a probabilistic distribution for a respective event; and
deducing a prediction of the derivable event by using complex event processing to combine information from the plurality of different copies of the Bayesian network, wherein the derivable event is an arrival of an item in a supply chain, and wherein the item is selected from the group consisting of objects from which goods will be produced at a factory.

* * * * *